No. 820,168. PATENTED MAY 8, 1906.
J. K. ANDREWS.
LAWN VASE.
APPLICATION FILED DEC. 1, 1905.
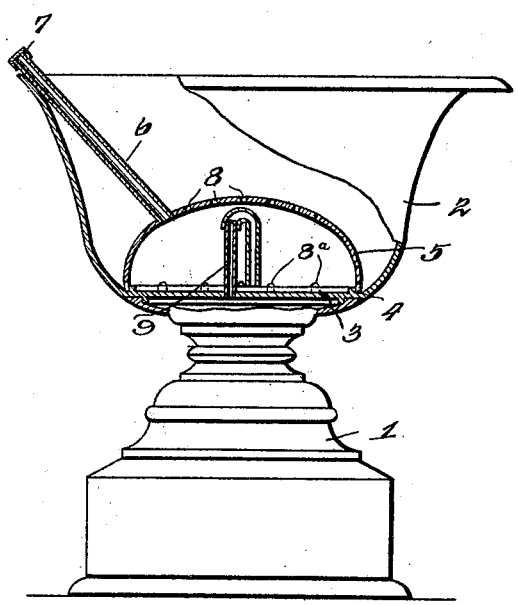
Witnesses
Frank Hough
John F. Byrne
Inventor
J. K. Andrews.
By Victor J. Evans
Attorney

UNITED STATES PATENT OFFICE.

JOHN K. ANDREWS, OF ELGIN, ILLINOIS.

LAWN-VASE.

No. 820,168.  Specification of Letters Patent.  Patented May 8, 1906.

Application filed December 1, 1905. Serial No. 289,886.

*To all whom it may concern:*

Be it known that I, JOHN K. ANDREWS, a citizen of the United States, residing at Elgin, in the county of Kane and State of Illinois, have invented new and useful Improvements in Lawn-Vases, of which the following is a specification.

My invention relates to that class of lawn-vases and flower-pots which are provided with reservoirs from which water is supplied to plants. In this class of lawn-vases and flower-pots there is no provision made for carrying off the excessive accumulation of water within the reservoir as the result of rain, which would work injury to the plants.

The primary object of my invention is to provide a novel and highly useful trap located within the reservoir to carry off the excess of water.

A further object of the invention is to provide a device of the character stated which is simple and which may be manufactured and sold at a comparatively low cost.

With the above and other objects in view the invention consists in the construction, combination, and arrangement of parts hereinafter fully described, claimed, and illustrated in the accompanying drawing, wherein the figure represents a lawn-vase constructed in accordance with my invention, the bowl of the vase being partially in section.

Referring to the drawing by reference-numerals, 1 designates the base, and 2 the bowl, of a lawn-vase. The bottom 3 of the bowl 2 is made flat and provided with an upstanding annular flange 4. A dome-shaped member 5 is positioned upon the bottom 3 and engages the flange 4, said flange 4 serving to retain the member 5 in applied position. The member 5 provides a reservoir in the bottom of the bowl 2 and is provided with a pipe 6, through which the reservoir may be supplied with water. The pipe 6 has one of its ends secured to the member 5 and is in communication with the reservoir, while its other end is positioned above the bowl 2 and provided with a removable cap 7. The crown and lower edge of the dome 5 are provided with perforations 8 and 8ª, respectively.

The reservoir is supplied with water by means of the pipe 6, and the entrance of water into the reservoir displaces all air therein, after which the cap 7 is applied to the pipe 6. The water flows out of the reservoir through the perforations 8ª into the soil. The water is carried upward around the outer edge of the soil in the bowl 2 and then toward the center by capillary attraction. As the water flows from the reservoir a vacuum is created therein, and through the medium of the openings 8 air is drawn through the soil.

It is apparent that the reservoir not only supplies water to the plants, but also provides them with the necessary carbon by causing air to be drawn through the soil.

In order to prevent the reservoir from being oversupplied and to carry off an excess of water accumulated therein as result of rain, I position within the reservoir a gooseneck-trap 9. The discharge end of the trap 9 is positioned within an opening in the bottom 3 of the bowl 2, while the intake thereof is positioned at a point adjacent the bottom 3. The trap 9 is of such a height as to retain a sufficient quantity of water within the reservoir to properly nourish the plants, and the depending arm thereof is made detachable, as is fully illustrated in the drawing, so that the same may be dispensed with when so desired.

From the foregoing description, taken in connection with the accompanying drawing, the construction and mode of operation of the invention will be understood without a further extended description.

Changes in the form, proportions, and minor details of construction may be made within the scope of the invention without departing from the spirit or sacrificing any of the advantages thereof.

Having fully described and illustrated my invention, what I claim is—

1. The combination of a lawn-vase having within the bowl thereof a water-reservoir, said reservoir being provided with perforations through which the water passes into the soil.

2. The combination of a lawn-vase having within the bowl thereof a water-reservoir, said reservoir being provided with lower perforations through which the water passes into the soil and upper perforations through the medium of which air is drawn down through the soil.

3. The combination of a lawn-vase having within the bowl thereof a water-reservoir, said reservoir being provided with perforations through which the water passes into the soil and other perforations through the medium of which air is drawn down through the soil, and a trap located within the reservoir.

4. In a device of the character described, the combination of a bowl, a dome-shaped member positioned within the bowl so as to provide the same with a reservoir, a supply-pipe for the reservoir, and a trap located within the reservoir.

5. In a device of the character described, the combination of a bowl provided with an upstanding flange on the bottom thereof, a dome-shaped member positioned within the bowl and engaging said flange, said member providing the bowl with a reservoir, a feed-pipe for the reservoir, and a trap located within the reservoir.

6. The combination of a lawn-vase having the bowl thereof provided with a flange, and a member positioned within the bowl and engaging the flange, said member providing the bowl with a reservoir.

In testimony whereof I affix my signature in presence of two witnesses.

JOHN K. ANDREWS.

Witnesses:
J. D. GAYLORD,
ARTHUR L. PAULSON.